PERFORATED RECORD CONTROLLED APPARATUS

Filed Aug. 25, 1958 4 Sheets-Sheet 1

PERFORATED RECORD CONTROLLED APPARATUS

Filed Aug. 25, 1958 4 Sheets-Sheet 2

PERFORATED RECORD CONTROLLED APPARATUS

Filed Aug. 25, 1958 4 Sheets-Sheet 4

United States Patent Office 3,014,653
Patented Dec. 26, 1961

3,014,653
PERFORATED RECORD CONTROLLED APPARATUS

William F. Collison, Escondido, Calif., assignor to Clary Corporation, San Gabriel, Calif., a corporation of California

Filed Apr. 25, 1958, Ser. No. 756,954
8 Claims. (Cl. 235—61.6)

This invention relates to record controlled apparatus and has particular reference to apparatus controlled by perforated records wherein the record is perforated in accordance with a combinational unit code and the apparatus registers an equivalent amount in a single unit code, i.e., the decimal system.

A principal object of the present invention is to simultaneously sense all of a field of perforations in a perforated record member, which perforations are arranged in accordance with a combinational unit code and to translate such information into a single unit code.

Another object is to eliminate the necessity for utilizing electrical circuits in an apparatus for sensing and translating a record which is perforated in a combinational code.

Another object is to provide a record controlled apparatus capable of sensing relatively small and closely spaced coded perforations in a card or tag.

A further object is to provide a cyclically operable record controlled apparatus in which a minimum amount of extra time is required to sense the record and to control the apparatus accordingly.

A still further object is to provide a simple and economical perforated record sensing mechanism capable of mechanically controlling the differential actuators of a calculating machine or the like.

The manner in which the above and other objects of the invention are accomplished will be readily understood on reference to the following specification when read in conjunction with the accompanying drawings, wherein:

FIGS. 1 and 2, when combined, form a longitudinal section view through a calculating machine embodying a preferred form of the present invention.

Figure 1:
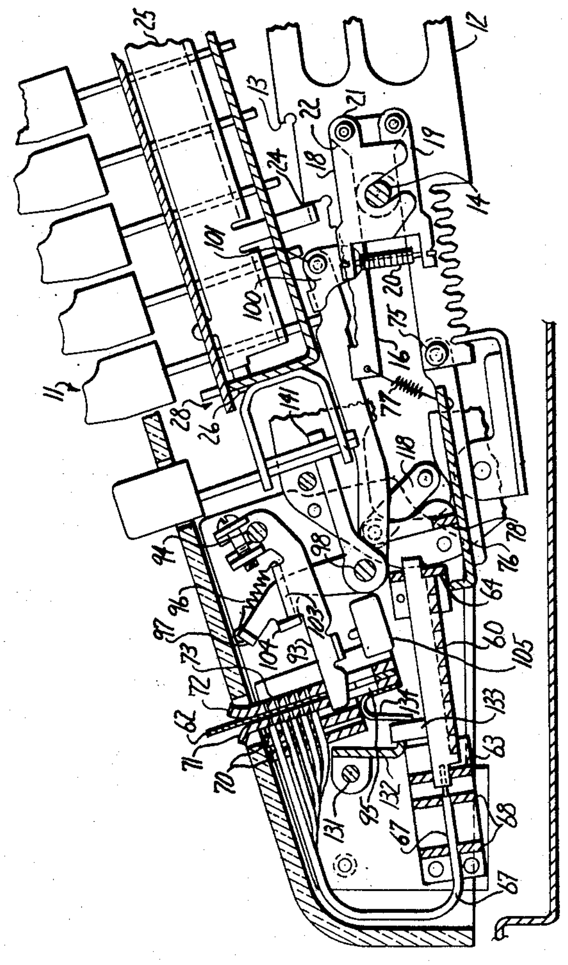

The calculating machine of the present disclosure is basically similar to the well-known and commercially available Clary adding-listing machine. The latter is generally disclosed and claimed in the R. E. Boyden Patent No. 2,583,810, issued on January 29, 1952. The accumulator embodied in such machine is disclosed and claimed in the E. P. Drake Patent No. 2,472,696, issued on June 7, 1949.

Accordingly, for the sake of brevity, reference is hereby made to the above patents for an understanding of the details of the machine, and the machine will be only generally described herein. However, it is to be understood that the invention may be equally well applied to other forms of calculating machines which embody differential actuators.

The machine includes a series of denominationally arranged banks of amount keys 11 ranging in numerical value from "1" to "9" and on which amounts may be manually entered into the machine, if desired. A differentially operable actuator rack 12 is located directly below each bank of amount keys and is provided with a series of stepped shoulders 13, each adapted to engage the stem of a depressed amount key whereby to limit forward advancing movement of the rack to a number of increments equal to the value of the key depressed.

The racks 12 are guided for fore and aft movement by shafts 14 and 15 (FIGS. 1 and 2, respectively) extending across the machine and embraced by slots 16 and 17, respectively, in the racks. The shaft 15 is stationary, but shaft 14 is movable fore and aft of the machine once during each machine cycle and is effective to yieldably advance the racks during such excursion. For this purpose, a pair of drive pawls 18 and 19 are associated with each rack and are pivotally mounted on the shaft 14. The pawls are urged in opposite directions about the shaft 14 by a tension spring 20 whereby to maintain rollers 21 thereon in engagement with lateral depressions 22 formed in the associated slot 16.

When, during forward movement of the shaft 14, a rack 12 is arrested by the stem of a depressed key, or otherwise as will appear later, the rollers 21 will ride out of the depressions 22, thus breaking the connection between the shaft 14 and the rack.

Figure 4:
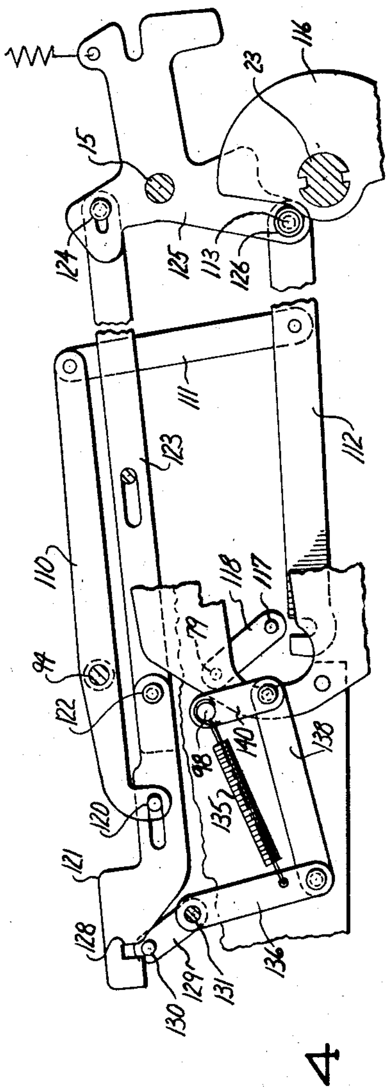
FIG. 4 is a side elevational view illustrating certain of the controls for the machine and tag sensing mechanism.

The shaft 14 is advanced forwardly during the early part of a machine cycle and is returned during the latter part of such cycle by a cyclically operable shaft 23 (FIGS. 2, 4 and 5) through suitable linkage (not shown).

Each rack 12 is normally blocked in its illustrated home position by a zero block 24 carried by a lock bail 25 which is pivotally supported on trunnion bearings 26 and 27 (FIGS. 1 and 2) located in a keyboard farme 28. Each lock bail (see also FIGS. 7 and 8) is normally held by a spring 30 against the sides of the stems of the keys 11 in the associated row. When all keys of any row are in their raised positions, the associated lock bail 25 will be so located as to position its zero block 24 directly in front of one of the stop shoulders 13 of the respective rack. Upon depression of any key, as indicated by the left hand key in FIG. 8, a cam lobe 31 thereon will become effective to rock the associated lock bail 25 sufficiently to remove its zero block 24 from blocking relation with the rack, thereby permitting the rack to be advanced. Each lock bail 25 is effective to latch any amount key in the associated bank in depressed position by engagement with the upper edge of the associated cam lobe 31.

For the purpose of releasing all depressed keys either automatically or manually, a bar 32 is provided, the latter being pivotally supported by a pair of spaced bell cranks 33 and 34 fulcrummed at 35 and 36, respectively. The bar is provided with a series of shoulders 37 located adjacent the different bails 25 whereby leftward movement of the bar 32 in FIG. 8 will be effective to release all lock bails 25 permitting any or all depressed amount keys to rise.

The racks 12 are associated with an accumulator, generally indicated at 40. The latter comprises a series of denominationally arranged gears 41 independently mounted on an accumulator shaft 42, and normally maintained out of mesh with upper and lower rack sections 43 and 44, respectively, formed on the racks.

Figure 2:
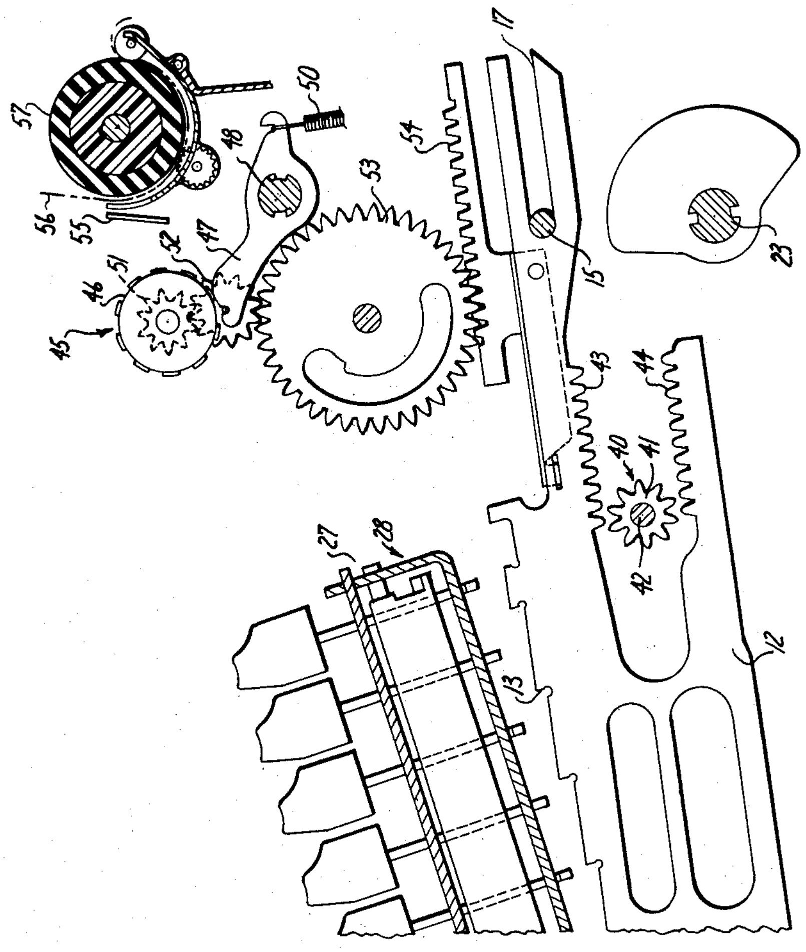

During additive amount entries into the accumulator, the accumulator gears 41 are maintained in mesh with the rack gear sections 43 of the racks during the forward advancement of the racks, i.e., to the left in FIG. 2, and are maintained in their illustrated neutral positions during return of the racks. Suitable tens transfer mechanism (not shown) is provided for effecting tens transfers during such return of the racks. During subtractive entries into the accumulator, the gears 41 are maintained in mesh with the lower rack gear sections 44 during advance of the racks and are maintained in neutral position during return of the racks.

The racks 12 are also associated with a printer, generally indicated at 45, whereby the racks may differentially set the printer to print a value corresponding to the numerical position to which the racks are advanced.

The printer comprises a series of numeral printing wheels 46, each entrained with a respective one of the racks 12. Each wheel has a series of type characters around its periphery ranging in value from "0" to "9." Each wheel 46 is rotatably mounted on a respective arm 47 which is loosely keyed on a printer control shaft 48 and is urged clockwise by a tension spring 50. A gear 51 integral with each printing wheel meshes with a gear 52 also carried by the arm 48.

Except during a printing operation, the arms 47 are held in their illustrated positions by the shaft 48 wherein each gear meshes with an associated one of a series of idler gears 53, which, in turn, are continuously meshed with rack sections 54 integral with the various racks 12.

After the racks are advanced leftward to their fully digitized positions, and before they return, the shaft 48 is rocked clockwise by suitable linkage (not shown) controlled by the shaft 23, permitting springs 50 to rock the levers 47 causing the type wheels 46 to print through an inked printing ribbon 55 against a paper tape 56 which is fed around a platen 57.

According to the present invention a plurality of sets of code bars 60 (FIGS. 1 and 3) are provided, one set for each denominational order of the machine. The code bars have permutation notches 61 (see FIG. 3) located along their lower edges and arranged in accordance with the particular code adopted. No two bars in any one set are provided with like notches, but all sets are identically notched.

Figure 3:
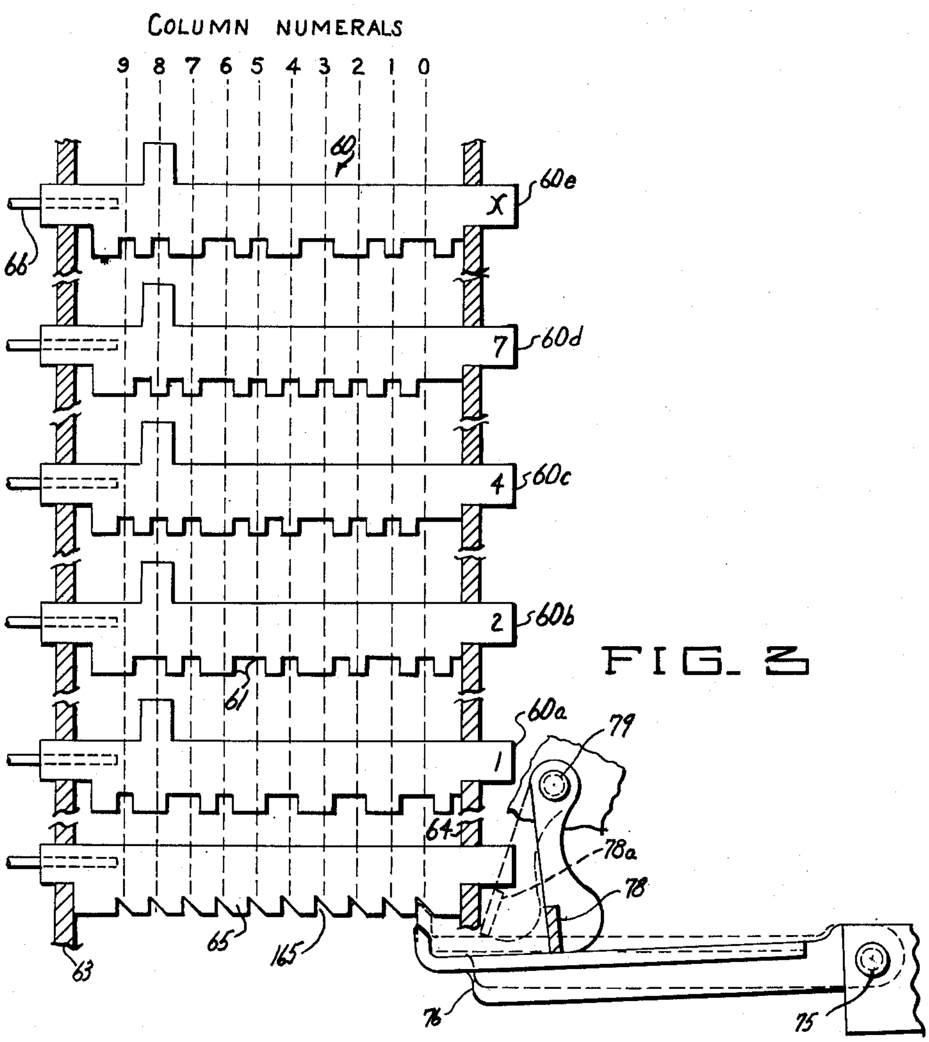
FIG. 3 is an enlarged developed view illustrating one denominational group of code bars.
Figure 9:
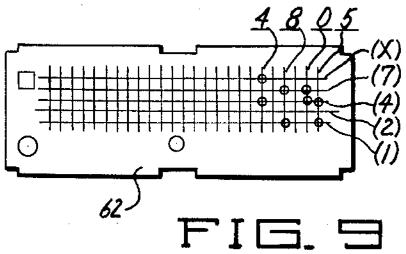
FIG. 9 is a front view of a typical perforated tag.

As will be seen in FIGS. 3 and 9, a five-level combination code is employed for the purpose of the present disclosure. Accordingly, a perforated tag 62 to be read is formed with a coordinate pattern of holes having five horizontal lines of holes which are located in accordance with the numerical data which such holes are arranged to represent. The lines of holes, counting from the bottom of the tag, have the values "1," "2," "4," "7" and "X" assigned to them. The various vertical lines of holes represent the different denominational digits in the value represented by the tag. For example, the holes in the tag 62 represent the value 4805.

The various code bars 60*a* to 60*e* of each set are located in side by side relation and are supported for limited lengthwise movement relative to each other in slots formed in parallel support plates 63 and 64.

A bar 65 having regularly spaced notches 165 therealong is located along the side of one of the code bars in each set and is restrained from lengthwise movement by the plates 63 and 64.

The various code bars are integrally attached to the ends of respective ones of a series of flexible Bowden cables 66. A sheath 67 for each of the cables is attached at one end thereof within openings formed in a pair of anchoring plates 68 extending across the machine. The opposite ends of the sheaths are attached in openings formed in a second pair of anchoring plates 70. The opposite ends of the cables 66 are slideably mounted in openings formed in a vertical guide plate 71 forming part of a tag chute for receiving a perforated tag, like tag 62.

The free ends of the cables are aligned with the different vertical and horizontal center lines of possible holes in the tag. A second guide plate 72 is supported in spaced relation to the plate 71 and is provided with a series of holes 73 therein aligned with the free ends of the Bowden cables 66 to permit the latter to pass therethrough when allowed to do so by aligned perforations in the tag.

During a machine cycle, the various code bars 60 are yieldably urged to the left, in FIGS. 1 and 3, causing the free ends of the cables 66 to move to the right toward an inserted tag 62. In those places in the tag where holes are not provided, the corresponding cables will be blocked from appreciable movement thereby holding their respective code bars in the relative positions shown in FIG. 3. However, in those places where a hole is located, the associated cable and code bar will be allowed to move until the code bar limits against the plate 63.

For the purpose of arresting the racks 12 in numerical positions corresponding to the numerical digits represented by the inserted tag, each rack 12 has pivoted thereto, at 75, a pawl 76 which is urged upwardly by a tension spring 77 tensioned between the same and the rack. Each pawl extends laterally across all of the code bars 60 and notched bar 65 in the associated set. Normally, the pawls 76 are held away from engagement with the code bars by a control bail 78 which maintains the pawls ineffective except during operations in which a perforated tag is to be sensed.

The notches in the various code bars 60 are so arranged that at a particular combinational setting of a set of bars the associated pawl 76 will ride along the under edge of one or more of such bars until it reaches a laterally aligned set of notches, permitting it to rise and thus engage in one of the notches 165 in the fixed bar 65 to arrest the rack in a numerical position indicative of the digit represented by the corresponding vertical row of holes in the tag.

If a zero, i.e. holes in the "4" and "7" rows, is represented in the tag or if a blank is presented in which no holes are provided, the pawl will, if otherwise allowed to do so by the bail 78, immediately rise into engagement with the first or zero set of notches to prevent appreciable movement of the corresponding rack. However, for example, if the bars 60*b* and 60*e* were positioned to the left, indicative of the digit "2," the pawl 76 would ride along the lands between the various notches 61 in the different bars until the No. 2 numerical position is reached.

In cases where the yieldable driving force applied to the racks is relatively light, the stationary bars 65 may be omitted, permitting the pawls 76 to arrest directly againts the sides of the notches 61 in the code bars.

The machine is driven by an electric motor (not shown) through a cyclic clutch, generally indicated at 80 (FIG. 5) whose driven side is connected to the cyclic drive shaft 23. The clutch 80 is controlled by a clutch dog 81 pivoted at 82 and coupled through a hook 83 to a clutch control bar 84. The latter is supported for endwise movement by pin and slot type supports 85 and 86.

Figures 5, 6, 7, 8:
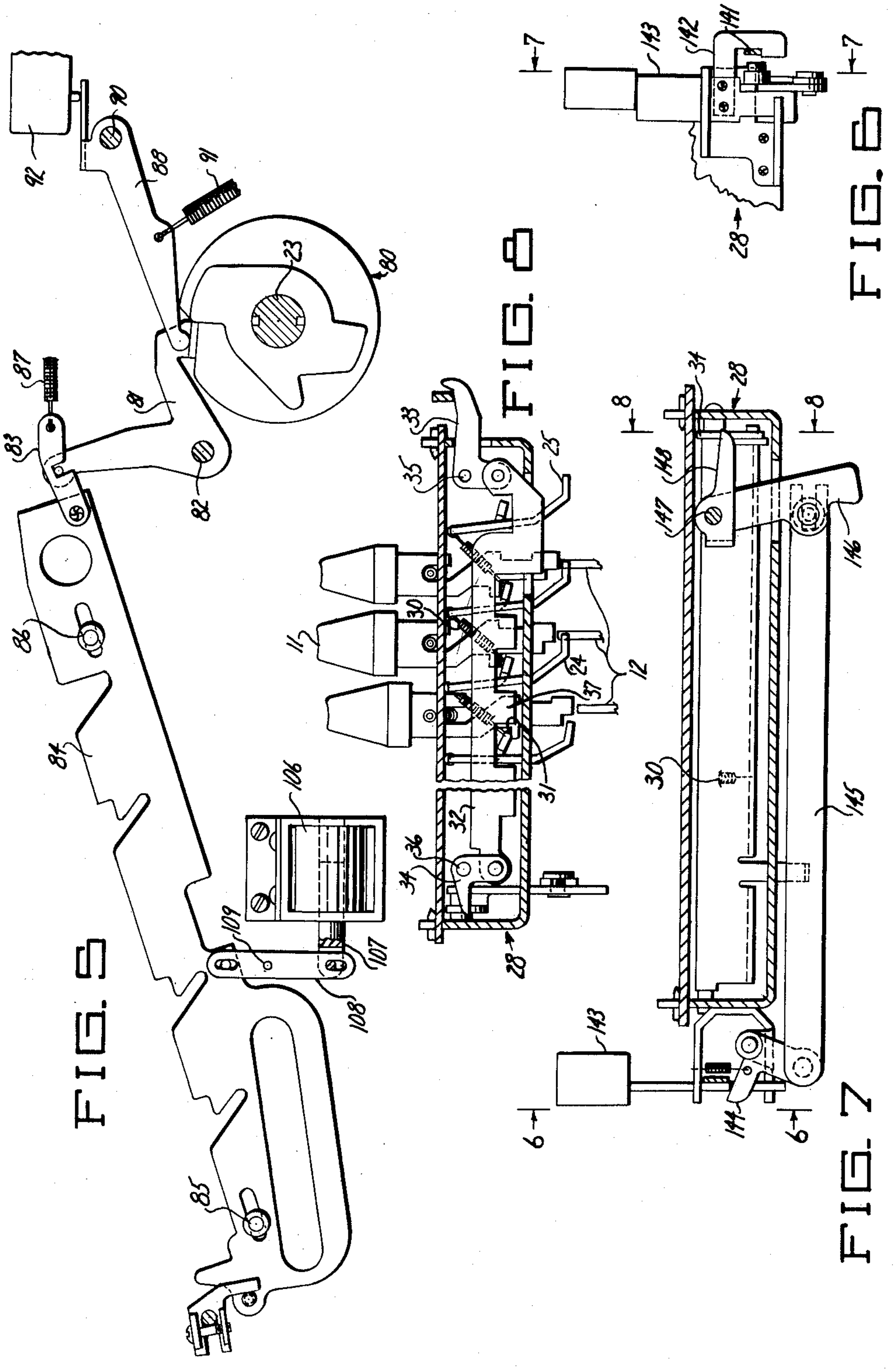
FIG. 5 is an elevational section view illustrating the machine clutch and its controls.
FIG. 6 is an elevational section view illustrating the keyboard clearance key and is taken substantially along the line 6—6 of FIG. 7.
FIG. 7 is an elevational section view illustarting part of the clearance control linkage and is taken along the line 7—7 of FIG. 6.
FIG. 8 is a sectional view through the keyboard, looking forwardly of the machine, and is taken along the line 8—8 of FIG. 7.

As disclosed in the above mentioned Boyden patent, depression of any of a series of motor control bars (not shown) is effective to force the clutch control bar 84 to the left in FIG. 5, against the action of a tensioned spring 87, to rock the clutch dog 81 counterclockwise to cause engagement of the clutch. Rocking of the clutch dog 81 is also effective to rock a switch control lever 88 about its pivot support 90 and against the action of a spring 91 to enable a switch 92 located in the motor circuit to close.

Means are provided whereby insertion of a perforated tag 62 in the tag chute is effective to cause operation of the machine and to condition the same to control the racks in accordance with the coded perforations in the tag. For this purpose, a lever 93 is provided which is attached to a rock shaft 94 and extends through slots 95 in the tag guide plates 71 and 72. The arm 93 is normally held in its position shown by a spring 96 tensioned between the arm 93 and a lever 97 pivotally mounted on a shaft 98. A rearwardly extending arm of the lever 97 carries a by-pass pawl 100 which is pivotally mounted thereto at 101.

When a tag 62 is inserted to its full depth in the tag chute, it lowers the arm 93, causing an ear 103 thereon to drop below an ear 104 on the lever 97. The spring 96 now rocks the lever 97 clockwise to lock the lever 93 in depressed position and to present the by-pass pawl 100 in the path of the rack drive shaft 14.

As the arm 93 reaches the bottom of its movement, it closes a switch 105 located in circuit with a solenoid 106 (FIG. 5) whose armature 107 is connected through a lever 108, fulcrumed at 109, to the clutch control bar 84, thereby actuating the bar to cause engagement of the clutch.

Rocking of the shaft 94 by the arm 93 is also effective to rock a beam 110 (FIG. 4) attached thereto. The beam is connected through a link 111 to a hook 112 pivoted at 113 to a cam follower 125 which is fulcrumed on the rack support shaft 15. A roller 126 on the cam follower 125 engages the periphery of a cam 116 keyed on the shaft 23.

The hook 112 is effective when raised by the beam 110 to couple with a pin 117 on an arm 118 attached to the above mentioned pawl control bail 78 so that as the shaft 23 is rotated, the bail can be rocked about its pivotal support 79 from its full line position shown in FIG. 3 to its alternate dot and dash line **78*a*, permitting the various pawls 76 to raise into sensing engagement with their associated sets of code bars 60**.

The beam 110 is also effective to cause the various Bowden cables 66 to be moved into sensing positions relative to an inserted tag. For this purpose, the beam 110 is coupled through a pin and slot connection 120 to a link 121 which is pivoted at 122 to a second link 123. The latter is coupled through a pin and slot connection 124 to the cam follower 125.

The link 121 is provided with a vertical slot 128 which is normally aligned with a pin 130 on an arm 129 fastened to a rock shaft 131. The latter is attached to a bail 132 (FIG. 1) which normally engages projections 133 on the various code bars 60 to normally hold the same in their right hand inactive positions illustrated in FIGS. 1 and 3 against the action of individual leaf springs 134 suitably attached to the tag guide plate 71. This is effected by a relatively heavy tension spring 135 which is attached to an arm 136 fastened on the rock shaft 131.

When the link 121 is lowered by the beam 110, the slot 128 therein embraces the pin 130 whereby when the links 121 and 123 are drawn rearwardly by the cam follower 125 during the early stages of the machine operation, the shaft 131 will be rocked clockwise, retracting the bail 132 from engagement with the code bar projections 133, thereby permitting the leaf springs 134 to yieldably urge the code bars to the left toward active control positions.

Means are provided for releasing any depressed amount keys 11 during an operation of the machine under control of a perforated tag 62. For this purpose, the arm 136 is coupled through link 138 to an arm 140 attached to the aforementioned rock shaft 98. The latter has also attached thereto an arm 141 which overlies a hook 142 (see also FIG. 6) attached to a depressible clear key 143. Therefore, upon actuation of the shaft 98 during a machine operation under control of a perforated tag, the clear key 143 will be lowered by the arm 141 and will be effective to rock a bell crank 144 (FIG. 7) which is connected by link 145 to a bell crank 146 pivoted at 147 and provided with an arm 148 underlying the bell crank (see also FIG. 8). Accordingly, the bell crank 148 will be effective to shift the latch control bar 32 to the left in FIG. 8 to release any depressed keys as was mentioned hereinbefore.

During the forward advancement of the rack drive shaft 14 during the early stages of a machine operation, the latter will merely cause the by-pass pawl 100 to rock counterclockwise about its pivotal support 101 on the lever 97 without rocking the latter. However, during return of the shaft 14 toward the end of the machine cycle, the shaft 14 will cam the by-pass pawl upwardly, carrying with it the lever 97 so as to return the same and the arm 93 to their normal illustrated positions, this action being effective to eject the perforated tag so that it may be replaced by another.

When it is desired to operate the machine under control of keys 11, it will be noted that due to the lack of an inserted tag 62, shaft 94 will not be rocked. Thus, beam 110 will not be rocked which leaves hook 112 inoperative. Link 121, which is coupled to beam 110 at 120, will therefore not be rocked, leaving pin 130 free of slot 128. Accordingly, the bail 132 will retain the code bars 60 in their ineffective positions during the ensuing cycle.

Although I have described my invention in detail and have therefore utilized certain specific terms and language herein, it is to be understood that the present disclosure is illustrative rather than restrictive and that changes and modifications may be made thereto without departing from the spirit or scope of the claims appended hereto.

Having thus described my invention, what I desire to secure by United States Letters Patent is:

1. Record controlled apparatus for a record having perforations therein combinationally arranged to represent values comprising, in combination, a value registering device, a differential actuator device therefor, a plurality of juxtaposed code bars having notches therealong arranged to conjointly convert a combinational unit code into a single unit code, means for yieldably advancing said actuator device along the lengths of said code bars, said actuator device being engageable with aligned notches only in said code bars whereby to arrest advancement of said actuator device, and sensing devices operatively connected to said code bars for sensing said perforations, said sensing devices being effective to set said code bars endwise relative to each other whereby to align certain of said notches in accordance with a value represented by said perforations.

2. Record controlled apparatus for a record having perforations therein combinationally arranged to represent values comprising, in combination, a value registering device, a differential actuator device therefor, a plurality of juxtaposed code bars having notches therealong arranged to conjointly convert a combinational unit code into a single unit code, a stationary bar juxtaposed said code bars and having regularly spaced notches therealong, means for yieldably advancing said actuator device along the lengths of said code bars and said stationary bar, said actuator device being engageable with aligned notches only in said code bars and in said stationary bar whereby to arrest advancement of said actuator device, and sensing devices operatively connected to said code bars for sensing said perforations, said sensing device being effective to set said code bars endwise relative to each other whereby to align certain of said notches with a notch in said stationary bar in accordance with a value represented by said perforations.

3. Record controlled apparatus for a record having perforations therein combinationally arranged to represent values comprising, in combination, a value registering device, a differential actuator device therefor, a plurality of juxtaposed code bars having notches therealong arranged to conjointly convert a combinational unit code into a single unit code, means for yieldably advancing said actuator device along the lengths of said code bars, said actuator device being engageable with aligned notches only in said code bars whereby to arrest advancement of said actuator device, perforation sensing elements operatively connected to respective ones of said code bars, said perforation sensing elements being adapted to enter perforations in a perforated record, and means for yieldably moving said sensing elements into sensing relation with said record whereby to set said code bars endwise relative to each other to align certain of said notches in accordance with the value represented by said perforations.

4. A record controlled apparatus for a record having perforations therein combinationally arranged to represent values comprising, in combination, a value registering device, a differential actuator device therefor, a plurality of juxtaposed code bars having notches therealong arranged to conjointly convert a combinational unit code into a single unit code, a stationary bar juxtaposed said code bars and having regularly spaced notches therein, means for yieldably advancing said actuator device along the lengths of said code bars and said stationary bar, said actuator device being engageable with aligned notches only in said code bars and said stationary bar whereby to arrest advancement of said actuator device, perforation sensing elements operatively connected to respective ones of said code bars, said perforation sensing elements being adapted to enter perforations in a perforated record, and means for yieldably moving said sensing elements into sensing relation with said record whereby to set said code bars endwise relative to each other to align certain of said notches with a notch in said stationary bar in accordance with a value represented by said perforations.

5. Record controlled apparatus for a record having perforations therein combinationally arranged to represent values comprising, in combination, a value registering device, a differential actuator therefor, a plurality of juxtaposed code bars having notches therealong arranged to conjointly convert a combinational unit code into a single unit code, means for yieldably advancing said actuator parallel to the lengths of said code bars, a pawl operatively connected to said actuator, means yieldably urging said pawl into engagement with said code bars, said pawl being adapted to engage aligned notches only in said code bars whereby to arrest said actuator, and sensing devices for sensing said perforations and for setting said code bars endwise relative to each other whereby to align certain of said notches in accordance with a value represented by said perforations.

6. Record controlled apparatus for a record having perforations therein combinationally arranged to represent values comprising, in combination, a value registering device, a differential actuator therefor, a plurality of juxtaposed code bars having notches therealong arranged to conjointly convert a combinational unit code into a single unit code, a stationary bar juxtaposed said code bars and having regularly spaced notches therein, means for yieldably advancing said actuator parallel to the lengths of said code bars and said stationary bar, a pawl operatively connected to said actuator, means yieldably urging said pawl toward engagement with said code bars and said stationary bar, said pawl being adapted to engage aligned notches only in said code bars and in said stationary bar whereby to arrest said actuator, and sensing devices for sensing said perforations and for setting said code bars endwise relative to each other whereby to align certain of said notches with a notch in said stationary bar in accordance with a value represented by said perforations.

7. Record controlled apparatus for a record having perforations therein combinationally arranged to represent values comprising, in combination, a value registering device, a differential actuator device therefor, a plurality of juxtaposed code bars having notches therealong arranged to conjointly convert a combinational unit code into a single unit code, means for yieldably advancing said actuator device along the lengths of said code bars, said actuator device being engageable with aligned notches only on said code bars whereby to arrest said actuator, a guide plate for a perforated record, said guide plate having a field of holes therein, sensing elements connected to respective ones of said code bars, said sensing elements being effective to move through aligned ones of said holes and said record perforations whereby to set respective ones of said code bars endwise to align certain of said notches in accordance with a value represented by said perforations.

8. Record controlled apparatus for a record having perforations therein combinationally arranged to represent values comprising, in combination, a value registering device, a differential actuator device therefor, a plurality of juxtaposed code bars having notches therealong arranged to conjointly convert a combinational unit code into a single unit code, means for yieldably advancing said actuator device along the lengths of said code bars, said actuator device being engageable with aligned notches only in said code bars whereby to arrest said actuator, a guide plate for a perforated record, said plate having a field of guide holes therein, flexible cables operatively connected at one end of each thereof to a respective one of said code bars, said cables being guided at the opposite end of each thereof in a respective one of said holes, and means for yieldably urging said cables through aligned perforations in said record whereby to set said code bars endwise to align certain of said notches in accordance with a value represented by said perforations.

References Cited in the file of this patent

UNITED STATES PATENTS

| | | |
|---|---|---|
| 1,863,098 | Borel | June 14, 1932 |
| 2,323,824 | Maschmeyer | July 6, 1943 |
| 2,673,034 | Smith | Mar. 23, 1954 |